(12) United States Patent
Keiser et al.

(10) Patent No.: US 6,361,653 B2
(45) Date of Patent: Mar. 26, 2002

(54) METHOD OF INCREASING RETENTION IN PAPERMAKING USING COLLOIDAL BOROSILICATES

(75) Inventors: Bruce A. Keiser; James E. Whitten, both of Naperville, IL (US)

(73) Assignee: Nalco Chemical Company, Naperville, IL (US)

( * ) Notice: Subject to any disclaimer, the term of this patent is extended or adjusted under 35 U.S.C. 154(b) by 0 days.

(21) Appl. No.: 09/839,017

(22) Filed: Apr. 22, 2001

Related U.S. Application Data

(62) Division of application No. 09/444,741, filed on Nov. 22, 1999, now Pat. No. 6,270,627, which is a division of application No. 08/940,888, filed on Sep. 30, 1997, now abandoned.

(51) Int. Cl.$^7$ .................. D21H 17/68; D21H 21/10; D21H 17/71
(52) U.S. Cl. .................. 162/181.6; 162/181.1; 162/181.5; 162/181.8; 162/164.1; 162/164.6; 162/166; 162/168.1; 162/168.3; 162/175; 162/178; 162/158; 162/183
(58) Field of Search .................. 162/158, 181.1, 162/181.6–181.8, 164.1, 164.6, 166, 168.1, 168.2–168.7, 160–162, 183–185, 175–178; 210/710, 723, 702, 705, 725, 732–736, 727–728, 731

(56) References Cited

U.S. PATENT DOCUMENTS

| | | | |
|---|---|---|---|
| 1,868,566 A | 7/1932 | Crossman | 162/181.6 X |
| 2,047,016 A | 7/1936 | Elias | 423/277 |
| 2,106,744 A | 2/1938 | Hood et al. | 502/439 |
| 2,574,902 A | 11/1951 | Bechtold et al. | 252/313 |
| 2,801,938 A | 8/1957 | Iler | 162/181.6 X |
| 2,919,222 A | 12/1959 | Hall, Jr. | 162/181.6 |
| 2,924,549 A | 2/1960 | Leverkusen et al. | 162/162 |
| 2,943,970 A | 7/1960 | Allen | 162/181.6 |
| 3,607,774 A | 9/1971 | Cummings | 516/81 |
| 4,072,622 A | 2/1978 | Kuhling et al. | 252/179 |
| 4,285,919 A | 8/1981 | Klotz et al. | 423/277 |
| 4,385,961 A | 5/1983 | Svending et al. | 162/175 |
| 4,388,150 A | 6/1983 | Sunden et al. | 162/175 |
| 4,554,142 A | 11/1985 | Höelderich et al. | 423/277 |
| 4,643,801 A | 2/1987 | Johnson | 162/164.1 |
| 4,656,016 A | 4/1987 | Taramasso et al. | 423/277 |
| 4,753,710 A | 6/1988 | Langley et al. | 162/164.3 |
| 4,775,586 A | 10/1988 | Bohrn et al. | 428/324 |
| 4,780,423 A | 10/1988 | Bluestein et al. | 436/527 |
| 4,795,531 A | 1/1989 | Sofia et al. | 162/164.6 |
| 4,871,251 A | 10/1989 | Preikschat et al. | 356/336 |
| 4,902,326 A | 2/1990 | Jarmon | 65/442 |
| 4,902,382 A | 2/1990 | Sakabe et al. | 162/175 |
| 4,913,775 A | 4/1990 | Langley et al. | 162/164.3 |
| 4,954,220 A | 9/1990 | Rushmore | 162/168.3 |
| 5,053,211 A | 10/1991 | Haddad | 423/703 |
| 5,098,520 A | 3/1992 | Begala | 162/168.1 |
| 5,185,062 A | 2/1993 | Begala | 162/168.1 |
| 5,316,753 A | 5/1994 | Nakagawa | 423/706 |
| 5,430,074 A | 7/1995 | Barnes et al. | 523/115 |
| 5,840,158 A | * 11/1998 | Choo et al. | 162/164.3 |
| 6,083,404 A | * 7/2000 | Sommese et al. | 210/723 |
| 6,254,782 B1 | * 7/2000 | Kreisler | 210/710 |
| 6,200,420 B1 | * 3/2001 | Begala et al. | 162/164.1 |

FOREIGN PATENT DOCUMENTS

| | | |
|---|---|---|
| DE | 1045376 | 12/1958 |
| WO | WO 96/30591 | 3/1996 |
| WO | WO 97/16598 | 5/1997 |

OTHER PUBLICATIONS

G. N. Sears, Jr. Anal. Chem., 28 (1956) 1981 "Determination of Specific Surface Area of Colloidal Silica by Titration with Sodium Hydroxide".
R. K. Iler, The Chemistry of Silica, Wiley, New York, 1979.
J. Phys. Chem. 60 (1956), pp. 955–957, Degree of Hydration of Particles of Colloidal Silica in Aqueous Solution, R. K. Iler and R. L. Dalton.
"Modern Methods of Particle Size Analysis"—H. Barth, Chem. Anal. (1984), pp. 93–116.

* cited by examiner

*Primary Examiner*—Jose Fortuna
(74) *Attorney, Agent, or Firm*—Margaret M. Brumm; Thomas M. Breininger

(57) ABSTRACT

The invention comprises a borosilicate retention aid composition and a method for improving the production of paper by addition of the borosilicate. The borosilicate may be utilized in conjunction with a high molecular weight synthetic flocculent and/or starch, with or without the addition of a cationic coagulant. The borosilicate material is preferably a colloidal borosilicate. Methods for the preparation of the borosilicate material are disclosed.

8 Claims, No Drawings

METHOD OF INCREASING RETENTION IN PAPERMAKING USING COLLOIDAL BOROSILICATES

CROSS-REFERENCE TO RELATED PATENT APPLICATIONS

This application is a divisional of U.S. patent application Ser. No. 09/444,741, filed Nov. 22, 1999, now U.S. Pat. No. 6,270,627 B1; which is a divisional of U.S. patent application Ser. No. 08/940,888, filed Sep. 30, 1997, now abandoned.

BACKGROUND OF THE INVENTION

1. Field of the Invention

The invention relates to a borosilicate retention aid composition and, a method of using the borosilicate retention aid composition in the production of paper. A method of making such borosilicate retention aid composition is also disclosed. The borosilicate materials are preferably an aqueous suspension of colloidal borosilicate.

2. Background of the Invention

In the manufacture of paper, an aqueous cellulosic suspension or furnish is formed into a paper sheet. The slurry of cellulosic fiber is generally diluted to a consistency (percent dry weight of solids in the furnish) having a fiber content of about 4 weight percent of fiber or less, and generally around 1.5% or less and often below 1.0% ahead of the paper machine, while the finished sheet typically has less than 6 weight percent water. Hence the dewatering and retention aspects of papermaking are extremely important to the efficiency and cost of the manufacture.

Gravity dewatering is the preferred method of drainage because of its relatively low cost. After gravity drainage more expensive methods are used for dewatering, for instance vacuum, pressing, felt blanket blotting and pressing, evaporation and the like. In actual practice a combination of such methods is employed to dewater, or dry, the sheet to the desired water content. Since gravity drainage is both the first dewatering method employed and the least expensive, an improvement in the efficiency of this drainage process will decrease the amount of water required to be removed by other methods and hence improve the overall efficiency of dewatering and reduce the cost thereof.

Another aspect of papermaking that is extremely important to the efficiency and cost is retention of furnish components on and within the fiber mat. The papermaking furnish represents a system containing significant amounts of small particles stabilized by colloidal forces. A papermaking furnish generally contains, in addition to cellulosic fibers, particles ranging in size from about 5 to about 1000 nm consisting of for example cellulosic fines, mineral fillers (employed to increase opacity, brightness and other paper characteristics) and other small particles that generally, without the inclusion of one or more retention aids, would in significant portion pass through the spaces (pores) between the mat formed by the cellulosic fibers on the papermachine.

Greater retention of fines, fillers, and other components of the furnish permits, for a given grade of paper, a reduction in the cellulosic fiber content of such paper. As pulps of lower quality are employed to reduce papermaking costs, the retention aspect of papermaking becomes more important because the fines content of such lower quality pulps is generally greater. Greater retention also decreases the amount of such substances lost to the whitewater and hence reduces the amount of material wastes, the cost of waste disposal and the adverse environmental effects therefrom. It is generally desirable to reduce the amount of material employed in a papermaking process for a given purpose, without diminishing the result sought. Such add-on reductions may realize both a material cost savings and handling and processing benefits.

Another important characteristic of a given papermaking process is the formation of the paper sheet produced. Formation may be determined by the variance in light transmission within a paper sheet, and a high variance is indicative of poor formation. As retention increases to a high level, for instance a retention level of 80 or 90%, the formation parameter generally declines.

Various chemical additives have been utilized in an attempt to increase the rate at which water drains from the formed sheet, and to increase the amount of fines and filler retained on the sheet. The use of high molecular weight water soluble polymers was a significant improvement in the manufacture of paper. These high molecular weight polymers act as flocculants, forming large flocs which deposit on the sheet. They also aid in the dewatering of the sheet. In order to be effective, conventional single and dual polymer retention and drainage programs require incorporation of a higher molecular weight component as part of the program. In these conventional programs, the high molecular weight component is added after a high shear point in the stock flow system leading up to the headbox of the paper machine. This is necessary since flocs are formed primarily by the bridging mechanism and their breakdown is largely irreversible and do not re-form to any significant extent. For this reason, most of the retention and drainage performance of a flocculant is lost by feeding it before a high shear point. To their detriment, feeding high molecular weight polymers after the high shear point often leads to formation problems. The feed requirements of the high molecular weight polymers and copolymers which provide improved retention often lead to a compromise between retention and formation.

While successful, high molecular weight flocculant programs were improved by the addition of so called inorganic "microparticles".

Polymer/microparticle programs have gained commercial success replacing the use of polymer-only retention and drainage programs in many mills. Microparticle containing programs are defined not only by the use of a microparticle component but also often by the addition points of chemicals in relation to shear. In most microparticle containing retention programs, high molecular weight polymers are added either before or after at least one high shear point. The inorganic microparticulate material is then usually added to the furnish after the stock has been flocculated with the high molecular weight component and sheared to break down those flocs. The microparticle addition re-flocculates the furnish, resulting in retention and drainage that is at least as good as that attained using the high molecular weight component in the conventional way (after shear), with no deleterious impact on formation.

One such program employed to provide an improved combination of retention and dewatering is described in U.S. Pat. Nos. 4,753,710 and 4,913,775, to Langley et al., the disclosures of which are hereinafter incorporated by reference into this specification. In the method disclosed in Langley et al., a high molecular weight linear cationic polymer is added to the aqueous cellulosic papermaking suspension before shear is applied to the suspension, followed by the addition of bentonite after the shear application. Shearing is generally provided by one or more of the cleaning, mixing and pumping stages of the papermaking process, and the shear breaks down the large flocs formed by the high molecular weight polymer into microflocs. Further agglomeration then ensues with the addition of the bentonite clay particles.

Other such microparticle programs are based on the use of colloidal silica as a microparticle in combination with cationic starch such as that described in U.S. Pat. Nos. 4,388,150 and 4,385,961, the disclosures of which are hereinafter incorporated by reference into this specification, or the use of a cationic starch, flocculant, and silica sol combination such as that described in both U.S. Pat. Nos. 5,098,520 and 5,185,062, the disclosures of which are also hereinafter incorporated by reference into this specification. U.S. Pat. No. 4,643,801 claims a method for the preparation of paper using a high molecular weight anionic water soluble polymer, a dispersed silica, and a cationic starch.

Although, as described above, the microparticle is typically added to the furnish after the flocculant and after at least one shear zone, the microparticle effect can also be observed if the microparticle is added before the flocculant and the shear zone (e.g., wherein the microparticle is added before the screen and the flocculant after the shear zone).

In a single polymer/microparticle retention and drainage aid program, a flocculant, typically a cationic polymer, is the only polymer material added along with the microparticle. Another method of improving the flocculation of cellulosic fines, mineral fillers and other furnish components on the fiber mat using a microparticle is in combination with a dual polymer program which uses, in addition to the microparticle, a coagulant and flocculant system. In such a system a coagulant is first added, for instance a low molecular weight synthetic cationic polymer or cationic starch. The coagulant may also be an inorganic coagulant such as alum or polyaluminum chlorides. This addition can take place at one or several points within the furnish make up system, including but not limited to the thick stock, white water system, or thin stock of a machine. This coagulant generally reduces the negative surface charges present on the particles in the furnish, particularly cellulosic fines and mineral fillers, and thereby accomplishes a degree of agglomeration of such particles. The coagulant treatment is followed by the addition of a flocculant. Such a flocculaqnt generally is a high molecular weight synthetic polymer which bridges the particles and/or agglomerates, from one surface to another, binding the particles into larger agglomerates. The presence of such large agglomerates in the furnish, as the fiber mat of the paper sheet is being formed, increases retention. The agglomerates are filtered out of the water onto the fiber web, whereas unagglomerated particles would, to a great extent, pass through such a paper web. In such a program the order of addition of the microparticle and flocculant can be reversed successfully.

The present invention departs from the disclosures of these patents in that a borosilicate, preferably a colloidal borosilicate is utilized as the microparticle. Surprisingly we have found that borosilicates provide improved performance over other microparticle programs, and especially those using colloidal silica sols as the microparticle. The borosilicate microparticles of the invention allow the production of paper and board having improved levels of retention, formation, uniform porosity, and overall dewatering.

SUMMARY OF THE INVENTION

One aspect of the invention comprises a borosilicate retention aid composition. The borosilicates, preferably aqueous solutions of colloidal particles of borosilicate, useful in this invention have a mole ratio of boron to silicon of from 1:1000 to 100:1 and generally from 1:100 to 2:5. Preferably the mole ratio of sodium to silicon in the borosilicate materials of this invention ranges from 0.006 to 1.04 and even more preferably ranges between 0.01 to 0.7. A further aspect of the invention comprises a papermaking system which comprises the steps of adding to a papermaking furnish from about 0.00005 to about 1.25% by weight, based on the weight of the dry fiber in the furnish, of a borosilicate. In an alternative embodiment, a nonionic, cationic, or anionic polymeric flocculant is added to the furnish either before or after addition of the borosilicate in an amount of from about 0.001 to about 0.50% by weight based on the dry weight of fiber in the furnish. An alternative is the addition of cationic starch or guar gum in place of or in addition to a polymeric flocculant to the furnish either before or after addition of the borosilicate in an amount of from about 0.005 to about 5.0% by weight based on the dry weight of fiber in the furnish. Another alternative is the addition of a coagulant to the furnish in an amount ranging from 0.005 to 1.25% by weight of the dry weight of the fiber in the furnish. The flocculation of components of the papermaking furnish is increased when the borosilicate is added alone or in combination with a conventional polymeric flocculant, alone or in combination with a coagulant.

By the addition of the borosilicate particles of this invention to a papermaking furnish or slurry prior to sheet formation, improved sheet properties may be obtained. As used herein, the term furnish or slurry is meant as a suspension of cellulosic fibers used to form a cellulosic sheet. The sheet may be a fine paper (which as used herein includes virgin-fiber-based as well as recycle-fiber based materials), board (which as used herein includes recycle-fiber based test liner and corrugating medium as well as virgin-fiber based materials),and newsprint (which as used herein includes magazine furnishes as well as both virgin fiber and recycle-fiber based), or other cellulosic material. The final sheet may contain in addition to a cellulosic fiber mat, fillers, pigments, brighteners, sizing agents, and other materials used in the production of the numerous grades of cellulosic mats commonly referred to as paper or board.

DETAILED DESCRIPTION OF THE INVENTION

The invention comprises a retention and drainage aid composition comprising a borosilicate (preferably a colloidal borosilicate) having a mole ratio of boron to silicon ranging from about 1:100 to about 2:5. In a preferred embodiment of the invention, the borosilicate is characterized as having a mole ratio of sodium to silicon ranging from about 6:1000 to 1.04:1. The microparticle retention aid is preferably a colloid of borosilicate having a chemistry similar to that of borosilicate glass. The borosilicate is preferably used in the form of an aqueous colloid. This colloid is generally prepared by reacting an alkali metal salt of a boron containing compound with silicic acid under conditions resulting in the formation of a colloid. The borosilicate particles useful in this invention may have a particle size over a wide range, for example from 1 nm (nanometer) to 2 microns (2000 nm), and preferably from 1 nm to 1 micron. When a colloidal borosilicate is utilized the particle size will generally be in the range of from 1 nm to 200 nm and preferably from 1 to 80 nm and most preferably 20–80 nm. The surface area of the borosilicate particles useful in this invention can likewise vary over a wide range. Generally as particle size decreases, surface area will increase. The surface area should be in the range of 15 to 3000 m²/g and preferably 50 to 3000 m²/g. When the preferred colloidal borosilicate particles of the invention are utilized the surface area will generally be in the range of 250 to 3000 m²/g and preferably from 700 to 3000 m²/g.

The preferred colloidal borosilicate materials useful in this invention are generally prepared by first preparing silicic acid. This may be advantageously accomplished by contacting an alkali metal silicate solution, preferably a dilute solution of the alkali metal silicate with a commercial cation exchange resin, preferably a so called strong acid resin, in the hydrogen form and recovering a dilute solution of silicic acid. The silicic acid may then be added, with agitation to a dilute solution of an alkali metal borate at a pH of from 6–14, and a colloidal borosilicate product suspended in water is recovered. Alternatively, the alkali metal borate and the silicic acid may be added simultaneously to prepare suitable materials. In the usual practice of this invention, the concentration of the silicic acid solution utilized is generally from 3 to 8 percent by weight $SiO_2$, and preferably 5 to 7 percent by weight $SiO_2$. The weight percent of the borate solution utilized is generally 0.01 to 30 and preferably 0.4 to 20 weight percent as $B_2O_3$. The borate salt utilized may range over a wide variety of compounds. Commercial borax, sodium tetraborate decahydrate, or sodium tetraborate pentahydrate are the preferred material in the practice of this invention because of the ready availability of these materials and their low cost. Other water soluble borate materials may be utilized. We believe that any soluble alkali metal borate salt may be employed in the practice of this invention. The preparation of the colloidal borosilicate material of this invention may be accomplished with or without pH adjustment. It is sometimes advisable to conduct the reaction at a pH of 7.5 to 10.5 through the addition of an appropriate alkali metal hydroxide, preferably sodium hydroxide, to the reaction mixture. Best results have been obtained in the pH range of 8 to 9.5 although as will be appreciated, the synthesis procedures for the borosilicate compositions of this invention are still being optimized. We believe that agitation, rate of addition, and other parameters are non-critical to the formation of the colloidal borosilicate compositions of the invention. Other methods of preparing the colloidal borosilicates of this invention may also be utilized. These methods could encompass preparing the colloidal borosilicate as above and spray drying the particles followed by grinding, or other methods which would yield a borosilicate material meeting the parameters set forth above.

The invention further comprises a method of improving the production of paper which comprises the step of adding to a paper mill furnish from about 0.00005 to about 1.25% by weight based on the dry weight of fiber in the slurry or furnish of a borosilicate, preferably a colloidal borosilicate. In an alternative embodiment, a nonionic, cationic or anionic polymeric flocculant may be added to the furnish either before or after the addition of the borosilicate in an amount of from about 0.001 to about 0.5% by weight based on dry weight of fiber in the furnish. A cationic starch may alternatively be added to the furnish in place of, or in addition to the synthetic polymer flocculant in an amount of from about 0.005 to about 5.0% by weight based on the dry weight of fiber in the furnish. More preferably, the starch is added in an amount of from about 0.05 to about 1.5% by weight based on the dry weight of fiber in the furnish. In yet another embodiment, a coagulant may be added to the furnish in place of, or in addition to, the flocculent and/or the starch in an amount of from about 0.005 to about 1.25% by weight based on the dry weight of fiber in the papermaking furnish. Preferably the coagulant is added in an amount of from about 0.025 to about 0.5% by weight based on the dry weight of fiber in the furnish.

This invention is also directed to a method for increasing retention and drainage of a papermaking furnish on a papermaking machine which comprises the steps of adding to a papermaking furnish from about 0.00005 to about 1.25% by weight based on the dry weight of fiber in the furnish of a borosilicate particle, preferably a colloidal borosilicate. The borosilicate may be added to the papermaking furnish along with a nonionic, cationic or anionic polymeric flocculant. The flocculant may be added either before or after the borosilicate in an amount of from about 0.001 to about 0.5% by weight based on the dry weight of fiber in the furnish. Starch may alternatively be added to the furnish in place of or in addition to the flocculant in an amount of from about 0.005 to about 5.0% by weight based on dry weight of fiber in the furnish. If starch is utilized it is preferably a cationic starch. When used, the starch is preferably added in an amount of from about 0.05 to about 1.5% by weight based on the dry weight of fiber in the furnish. In yet another alternative, a coagulant may be added to the furnish in place of, or in addition to, the flocculant and/or the starch in an amount of from about 0.005 to about 1.25% by weight based on the dry weight of fiber in the furnish. Preferably, the coagulant is added in an amount of from about 0.025 to about 0.5% by weight based on the dry weight of fiber in the furnish.

The dosage of the polymeric flocculant in any of the above embodiments is preferably from 0.005 to about 0.2 weight percent based on the dry weight of fiber in the furnish. The dosage of the borosilicate is preferably from about 0.005 to about 0.25 percent by weight based on the weight of dry fiber in the furnish, and most preferably from about 0.005 to about 0.15% by weight of fiber in the furnish.

It should be pointed out that since this invention is applicable to a broad range of paper grades and furnishes the percentages given above may occasionally vary. It is within the spirit and intent of the invention that variance can be made from the percentages given above without departing from the invention, and these percentage values are given only as guidance to one skilled in the art.

In any of the above embodiments, bentonite, talc, synthetic clays, hectorite, kaolin, or mixtures thereof may also be added anywhere in the papermaking system prior to sheet formation. The preferred addition point is the thick stock pulp before dilution with whitewater. This application results in increased cleanliness of the papermaking operation which otherwise experiences hydrophobic deposition affecting both the productivity and the quality of paper.

In addition, any of the above embodiments may be applied to papermaking furnish selected from the group consisting of fine paper, (which as used herein includes virgin fiber based as well as recycle-fiber based materials), board (which as used herein includes recycle-fiber based test liner and corrugating medium as well as virgin-fiber based materials), and newsprint (which as used herein includes magazine furnishes as well as both virgin fiber and recycle-fiber based), or other cellulosic material. These furnishes include those that are wood-containing, wood-free, virgin, bleached recycled, unbleached recycled, and mixtures thereof.

Paper or paperboard is generally made from a suspension or furnish of cellulosic material in an aqueous medium, which furnish is subjected to one or more shear stages, in which such stages generally are a cleaning stage, a mixing stage and a pumping stage, and thereafter the suspension is drained to form a sheet, which sheet is then dried to the desired, and generally low, water concentration. The borosilicate materials of the invention may be added to the furnish before or after a shear stage.

In addition to the retention and drainage aid applications described above, the borosilicate materials may be used in conjunction with standard cationic wet strength resins to improve the wet strength of cellulosic sheet so treated. When utilized in this manner the borosilicate is added to the furnish prior to placement of the furnish, containing the wet strength resin, on a papermachine. The borosilicate is generally utilized at the levels set forth above.

The borosilicate of this invention has been found to significantly enhance the performance of synthetic polymeric flocculants and retention aids, and starch in the papermaking process. Further, the borosilicate materials are believed to have utility as additives in solids/liquids separation processes such as water pretreatment, and in wastewater treatment applications. The borosilicates in addition to enhancing drainage and retention in newsprint, fine paper, board and other paper grades, may also find utility in pitch and stickies control in papermaking, pulp dewatering in the production of dry-lap pulp, saveall and clarifier applications in pulp and paper mills, water clarification dissolved air flotation and sludge dewatering. The compositions of this invention may also find utility in solid/liquid separation or emulsion breaking. Examples of such applications are municipal sludge dewatering, the clarification and dewatering of aqueous mineral slurries, refinery emulsion breaking and the like. The enhanced performance seen utilizing the borosilicate particles of this invention in combination with synthetic polymers and or starch includes higher retention, improved drainage and improved solids/liquids separation, and often a reduction in the amount of polymer or starch used to achieve the desired effect.

Microparticle retention programs are based on the restoration of the originally formed flocs broken by shear. In such applications, the flocculant is added before at least one high shear point, followed by the addition of microparticle just before the headbox. Typically, a flocculant will be added before the pressure screens, followed by the addition of microparticle after the screens. However a method wherein this order may be reversed is contemplated herein. Secondary flocs formed by the addition of microparticles result in increased retention and drainage without detrimentally affecting formation of the sheet. This allows increased filler content in the sheet, eliminates two-sidedness of the sheet, and increases drainage and speed of the machine in paper manufacturing.

The use of a slight excess of polymeric flocculant and/or coagulant is believed necessary to ensure that the subsequent shearing results in the formation of microflocs which contain or carry sufficient polymer to render at least parts of their surfaces positively charged, although it is not necessary to render the whole furnish positively charged. Thus the zeta potential of the furnish, after the addition of the polymer and after the shear stage, may be cationic or anionic.

Shear may be provided by a device in the apparatus used for other purposes, such as a mixing pump, fan pump or centriscreen or one may insert into the apparatus a shear mixer or other shear stage for the purpose of providing shear, and preferably a high degree of shear, subsequent to the addition of the polymer.

The flocculants used in the application of this invention are high molecular weight water soluble or dispersible polymers which may have a cationic or anionic charge. Nonionic high molecular weight polymers may also be utilized. These polymers may be completely soluble in the papermaking system, or alternatively may be readily dispersible. They may have a branched or crosslinked structure provided that they do not form objectionable "fish eyes", so called globs of undissolved polymer on the finished paper. Polymers of these types are readily available from a variety of commercial sources. They are available as dry solids, aqueous solutions, water-in-oil emulsions which when added to water allow the polymer contained therein to rapidly solubilize, or as dispersions of the water soluble or dispersible polymer in aqueous brine solutions. The form of the high molecular weight flocculant used herein is not deemed to be critical so long as the polymer is soluble or dispersible in the furnish.

As stated above, the polymers may be cationic, anionic, or nonionic. Cationic polymer flocculants useful herein are generally high molecular vinyl addition polymers which incorporate a cationic functional group. These polymers are generally homopolymers of water soluble cationic vinyl monomers, or may be copolymers of a water soluble cationic vinyl monomer with a nonionic monomer such as acrylamide or methacrylamide. The polymers may contain only one cationic vinyl monomer, or may contain more than one cationic vinyl monomer. Alternatively, certain polymers may be modified or derivatized after polymerization such as polyacrylamide by the mannich reaction to produce a cationic vinyl polymer useful in the invention. The polymers may have been prepared from as little as 1 mole percent cationic monomer to 100 mole percent cationic monomer, or from a cationically modified functional group on a post polymerization modified polymer. Most often the cationic flocculants will have at least 5 mole percent of cationic vinyl monomer or functional group, and most preferably, at least 10 weight percent of cationic vinyl monomer or functional group.

Suitable cationic vinyl monomers useful in making the cationically charged vinyl addition copolymers and homopolymers of this invention will be well known to those skilled in the art. These materials include: dimethylaminoethyl methacrylate (DMAEM), dimethylaminoethyl acrylate (DMAEA), diethylaminoethyl acrylate (DEAEA), diethylaminoethyl methacrylate (DEAEM) or their quaternary ammonium forms made with dimethyl sulfate or methyl chloride, mannich reaction modified polyacrylamides, diallylcyclohexylamine hydrochloride (DACHA HCl), diallyldimethylammonium chloride (DADMAC), methacrylamidopropyltrimethylammonium chloride (MAPTAC) and allyl amine (ALA). Cationized starch may also be used as a flocculant herein. The flocculant selected may be a mixture of those stated above, or a mixture of those stated above with a cationic starch. Those skilled in the art of cationic polymer based retention programs will readily appreciate that the selection of a particular polymer is furnish, filler, grade, and water quality dependent.

High molecular weight anionic flocculants which may be useful in this invention are preferably water-soluble or dispersible vinyl polymers containing 1 mole percent or more of a monomer having an anionic charge. Accordingly, these polymers may be homopolymers or water soluble anionically charged vinyl monomers, or copolymers of these monomers with for instance non-ionic monomers such as acrylamide or methacrylamide. Examples of suitable anionic monomers include acrylic acid, methacrylamide 2-acrylamido-2-methylpropane sulfonate (AMPS) and mixture thereof as well as their corresponding water soluble or dispersible alkali metal and ammonium salts. The anionic high molecular weight polymers useful in this invention may also be either hydrolyzed acrylamide polymers or copolymers of acrylamide or its homologues, such as methacrylamide, with acrylic acid or its homologues, such as methacrylic acid, or with polymers of such vinyl monomers as maleic acid, itaconic acid, vinyl sulfonic acid, or other sulfonate containing monomers. Anionic polymers may contain sulfonate or phosphonate functional groups or mixtures thereof, and may be prepared by derivatizing polyacrylamide or polymethacrylamide polymers or copolymers. The most preferred high molecular weight anionic flocculants are acrylic acid/acrylamide copolymers, and sulfonate containing polymers such as those prepared by the polymerization of such monomers as 2-acrylamide-2-methylpropane sulfonate, acrylamido methane sulfonate, acrylamido ethane sulfonate and 2-hydroxy-3-acrylamide propane sulfonate with acrylamide or other non-ionic vinyl monomer. When used herein the polymers and copolymers of the anionic vinyl monomer may contain as little as 1 mole percent of the anionically charged monomer, and preferably at least 10 mole percent of the anionic monomer. Again the choice of the use of a particular anionic polymer will be dependent upon furnish, filler, water quality, paper grade, and the like.

While most microparticle programs perform well with only a high molecular weight cationic flocculant, we have seen surprising effects using the borosilicate particles of the invention with high molecular weight anionic water soluble flocculants with the addition of a cationic coagulant.

Nonionic flocculants useful in this invention may be selected from the group consisting of polyethylene oxide and poly(meth)acrylamide. In addition to the above, it may be advantageous to utilize so called amphoteric water soluble polymers in certain cases. These polymers carry both a cationic and an anionic charge in the same polymer chain.

The nonionic, cationic and anionic vinyl polymer flocculants useful herein will generally have a molecular weight of at least 500,000 daltons, and preferably molecular weights of 1,000,000 daltons and higher. Water soluble and/or dispersible flocculants useful herein may have a molecular weight of 5,000,000, or higher, for instance in the range of from 10 to 30 million or higher. The polymers of the invention may be entirely water soluble when applied to the system, or may be slightly branched (two-dimensional) or slightly cross linked (three dimensional) so long as the polymers are dispersible in water. The use of polymers which are entirely water soluble are preferred, but dispersible polymers, such as those described in WO 97/16598, may be employed. Polymers useful may be substantially linear as such term is defined in Langley et. al., U.S. Pat. No. 4,753,710. The upper limit for molecular weight is governed by the solubility or dispersiblity of the resulting product in the papermaking furnish.

Cationic or amphoteric starches useful in the application of this invention are generally described in U.S. Pat. No. 4,385,961. the disclosure of which has been incorporated by reference into this specification. Cationic starch materials are generally selected from the group consisting of naturally occurring polymers based on carbohydrates such as guar gum and starch. The cationic starch materials believed to be most useful in the practice of this invention include starch materials derived from wheat, potato and rice. These materials may in turn be reacted to substitute ammonium groups onto the starch backbone, or cationize in accordance with the process suggested by Dondeyne et al. in WO 96/30591. In general starches useful in this invention have a degree of substitution (d.s.) of ammonium groups within the starch molecule between about 0.01 and 0.05. The d.s. is obtained by reacting the base starch with either 3-chloro-2-hydroxypropyl-trimethylammonium chloride or 2,3-epoxypropyl-trimethylammonium chloride to obtain the cationized starch. As will be appreciated it is beyond the scope and intent of this invention to describe means for the cationizing of starch materials and these modified starch materials are well known and are readily available from a variety of commercial sources.

Various characteristics of the cellulosic furnish, such as pH, hardness, ionic strength and cationic demand, may affect the performance of a flocculant in a given application. The choice of flocculant involves consideration of the type of charge, charge density, molecular weight and type of monomers and is particularly dependent upon the water chemistry of the furnish being treated.

Other additives may be charged to the cellulosic furnish without any substantial interference with the activity of the present invention. Such other additives include for instance sizing agents, such as alum and rosin, pitch control agents, extenders, biocides and the like. The cellulosic furnish to which the retention aid program of the invention is added may also contain pigments and or fillers such as titanium dioxide, precipitated and/or ground calcium carbonate, or other mineral or organic fillers. It may be possible, and it is within the spirit of the invention that the instant invention may be combined with other so called microparticle programs such as bentonite, kaolin, and silica sols. However data demonstrated herein shows that the particles of the subject invention out perform these materials, and the combination thereof may yield a performance level less than either of the materials by themselves. Nevertheless, when papermakers change grades or furnishes it is possible that in certain situations the combination of the borosilicate materials of the invention with other microparticles may be practical and desirable.

The borosilicate microparticles of the invention may also be used in combination with a coagulant according to the teachings of Sofia et. al., U.S. Pat. No. 4,795,531, the disclosure of which is hereinafter incorporated by reference into this specification. Sofia teaches a microparticle program in which a microparticle is utilized in the presence of a cationic coagulant and a high molecular weight charged flocculant.

The cationic coagulant materials which may find use in this aspect of the invention include well known commercially available low-to mid molecular weight water soluble polyalkylenepolyamines including those prepared by the reaction of an alkylene polyamine with a difunctional alkyl halide. Materials of this type include condensation polymers prepared from the reaction of ethylenedichloride and ammonias, ethylene dichloride, ammonia and a secondary amine such as dimethyl amine, epichlorohydrin-dimethylamine, epichlorohydrin-dimethylamine-ammonia, polyethyleneimines, and the like. Also useful will be low molecular weight solution polymers and copolymers of vinyl monomers such as diallyldimethylammonium halides, especially diallyldimethylammonium chloride, dialkylaminoalkylacrylates, dialkylaminoalkylacrylate quaternaries, and the like where 'alkyl' is meant to designate a group having 1–4, and preferably 1–2 carbon atoms. Preferably 'alkyl' is methyl. These monomers are exemplified by such materials as dimethylaminoethyl acrylate, dimethyl-aminoethyl methacrylate and their water-soluble quaternary ammonium salts. In certain cases cationic starch may be employed as the coagulant. Inorganic coagulants, e.g., alum and polyaluminum chloride, may also be used in this invention. The usage rate of inorganic coagulants is typically from 0.05 to 2 weight percent based on the dry weight of fiber in the furnish. The use of a coagulant with the borosilicate microparticles of this invention is optional.

The present method is applicable to all grades and types of paper products that contain the fillers described herein, and further applicable for use on all types of pulps including, without limitation, chemical pulps, including sulfate and sulfite pulps from both hardwood and softwood, thermo-mechanical pulps, mechanical pulps and groundwood pulps.

The amount of any mineral filler used in the papermaking process, generally employed in a papermaking stock is from about 10 to about 30 parts by weight of the filler per hundred parts by weight of dry fiber in the furnish, but the amount of such filler may at times be as low as about 5, or even 0, parts by weight, and as high as about 40 or even 50 parts by weight, same basis.

The following examples are presented to describe preferred embodiments and utilities of the invention and are not meant to limit the invention unless otherwise stated in the claims appended hereto.

EXAMPLES 1–23

Each of the Examples shown in Table I below was prepared using the following general procedure and varying the relative amounts of reagents.

Silicic acid was prepared following the general teaching of Bechtold et al., U.S. Pat. No. 2,574,902. A commercially available sodium silicate available from OxyChem, Dallas, Tex. having a silicon dioxide content of about 29% by weight and a sodium oxide content of about 9% by weight was diluted with deionized water to a silicon dioxide concentration of 8–9% by weight. A cationic exchange resin such as Dowex HGR-W2H or Monosphere 650C, both available from Dow Chemical Company, Midland, Mich. was regenerated to the H-form via treatment with mineral acid following well established procedures. The resin was rinsed following regeneration with deionized water to insure complete removal of excess regenerant. The dilute silicate solution was then passed through a column of the regenerated washed resin. The resultant silicic acid was collected.

Simultaneously, an appropriate amount of borax solution (reagent grade sodium tetraborate decahydrate) was combined with an appropriate amount of aqueous sodium hydroxide to form a "heel" for the reaction. Optionally, water may be added to the heel to insure adequate volume during the early stages of formation.

Freshly prepared silicic acid was then added to the "heel" with agitation at room temperature. Agitation was continued for 60 minutes after complete addition of the silicic acid. The resulting colloidal borosilicate may be used immediately, or stored for later use. The table below gives amounts of silicic acid, sodium hydroxide, and sodium tetraborate decahydrate (borax) as well as pH.

TABLE I

Colloidal Borosilicates

| Example | Borax | NaOH | Acid Sol | B/Si | Na/Si | Final pH |
|---|---|---|---|---|---|---|
| 1 | 0.025 M (50 mL) | 0.1 M (18.3 mL) | 130 mL of 1.032 g/mL | 0.042 | 0.037 | 8.5 |
| 2 | 0.025 M (50 mL) | 0.1 M (18.5 mL) | 140 mL of 1.046 g/mL | 0.028 | 0.025 | 8.0 |
| 3 | 0.025 M (50 mL) | 0.1 M (18.5 mL) | 140 mL of 1.032 g/mL | 0.039 | 0.034 | 8.0 |
| 4 | 0.025 M (50 mL) | 0.1 M (22.7 g) | 140 mL of 1.045 g/mL | 0.028 | 0.027 | 8.5 |
| 5 | 0.025 M (50 mL) | 0.1 M (24.3 g) | 140 mL of 1.043 g/mL | 0.029 | 0.029 | 9.4 |
| 6 | 0.1 M (50 mL) | 1.0 M (9.7 mL) | 140 mL of 1.043 g/mL | 0.117 | 0.116 | 9.4 |
| 7 | 0.1 M (50 mL) | 1.0 M (9.7 mL) | 140 mL of 1.046 g/mL | 0.109 | 0.107 | 9.2 |
| 8 | 0.1 M (27.6 mL) | 1.0 M (10.9 mL) | 140 mL of 1.046 g/mL | 0.063 | 0.062 | 8.7 |
| 9 | — | — | 249 g of 1.047 g/mL | 0 | 0.208 | — |
| 10 | 0.1 M (50 mL) | 1.0 M (9.7 g) | 70 mL of 1.045 g/mL | 0.223 | 0.220 | 9.5 |
| 11 | 0.1 M (50 mL) | 1.0 M (9.7 g) | 70 mL of 1.045 g/mL | 0.223 | 0.220 | 9.5 |
| 12 | 0.1 M (50 mL) | 1.0 M (9.7 g) | 105 mL of 1.045 g/mL | 0.149 | 0.146 | 9.2 |
| 13 | 0.1 M (446 mL) | 4.57 mL of 50 wt % NaOH | 1343 mL of 1.040 g/mL | 0.117 | 0.115 | 9.1 |
| 14 | 0.1 M (223 mL) | 2.39 mL of 50 wt % NaOH | 1307 mL of 1.040 g/mL | 0.063 | 0.062 | 8.5 |
| 15 | 0.1 M (50 mL) | 1.0 M (24.3 mL) | 150 mL of 1.040 g/mL | 0.117 | 0.201 | 9.9 |
| 16 | 0.1 M (100 mL) | 2.0 mL of 50 wt % NaOH | 100 mL of 1.040 g/mL | 0.352 | 0.510 | 10.6 |
| 17 | 0.1 M (100 mL) | 2.0 mL of 50 wt % NaOH | 50 mL of 1.040 g/mL | 0.704 | 1.02 | 11.1 |
| 18 | 0.1 M (17 mL) | 2.0 mL of 50 wt % NaOH | 150 mL of 1.040 g/mL | 0.039 | 0.242 | 11.0 |
| 19 | 0.1 M (50 mL) | 2.0 mL of 50 wt % NaOH | 150 mL of 1.040 g/mL | 0.117 | 0.281 | 10.7 |
| 20 | 0.1 M (500 mL) | 12.81 mL of 50 wt % NaOH | 1500 mL of 1.040 g/mL | 0.117 | 0.202 | 10.1 |
| 21 | 0.1 M (500 mL) | 12.81 mL of 50 wt % NaOH | 1500 mL of 1.040 g/mL | 0.117 | 0.202 | 10.1 |
| 22 | 0.1 M (50 mL) | 1.0 M (24.3 mL) | 150 mL of 1.040 g/mL | 0.117 | 0.201 | 10.1 |
| 23 | 0.1 M (50 mL) | 1.0 M (9.7 g) | 150 mL of 1.040 g/mL | 0.117 | 0.116 | 8.9 |

The commercially available compounds defined in Table II below are used throughout the following Examples. Unless otherwise indicated, all are available from Nalco Chemical Company, One Nalco Center, Naperville, Ill. 60563-1198.

TABLE II

| Product | Description |
|---|---|
| Nalco ® 8671 | A commercially available colloidal silica. This material has an average particle size of 4 nm. a surface area of 750 m²/g, and about 15% by weight $SiO_2$ |

TABLE II-continued

| Product | Description |
|---|---|
| Nalco ® 74907 | A commercially available colloidal Silica having an average particle size of 7 nm, a surface area of 372 m$^2$/g, and containing about 15% by weight as SiO$_2$ |
| Polymer "A" | A commercially available copolymer having a molecular weight greater than 1 million daltons containing approximately 10 mole percent of dimethylaminoethylacrylate, methyl chloride quaternary and 90 mole percent acrylamide copolymer containing approximately 26 percent by weight solids. |
| Solvitose N | A cationized potato starch which is cold water soluble. |
| Polymer "B" | A commercially available cationic copolymer flocculant having a molecular weight greater than 1 million daltons containing approximately 10 mole percent copolymer of dimethylaminoethylacrylate benzyl chloride quaternary and 90 mole percent acrylamide copolymer. |
| Polymer "C" | A commercially available epichlorohydrin-dimethylamine condensation polymer containing about 45 weight percent polymer. |
| Polymer "G" | A commercially available high molecular weight copolymer containing approximately 10 mole percent dimethylaminoethylmethacrylate and 90 mole percent acrylamide. |
| Polymer "D" | A commercially available copolymer having a molecular weight greater than 1 million daltons containing approximately 30 mole percent sodium acrylate and 70 mole percent acrylamide. |
| Polymer "E" | A commercially available copolymer flocculant having a molecular weight greater than 1 million daltons containing approximately 17 mole percent dimethylaminoethyl acrylate and 83 mole percent acrylamide. |
| Polymer "F" | A commercially available copolymer flocculant having a molecular weight greater than 1 million daltons containing approximately 10 mole percent of dimethylaminoethylacylate-methylchloride quaternary and 90 mole percent acrylamide. |
| BMA 0 | a colloidal silica sol available from Eka Nobel, Surte, Sweden |
| BMA 670 | colloidal silica sol available from Eka Nobel, Surte, Sweden |
| BMA 780 | colloidal aluminum coated silica sol available from Eka Nobel, Surte, Sweden |

The following describes the preparation of Example 9 appearing in Table I. A control was prepared for comparison purposes. This amounts to carrying out the synthesis without borax in the heel. A colloidal silica was prepared by taking 9.68 g of a commercially available sodium silicate and diluting with 22 g of water. The mixture was agitated with a magnetic stir bar and brought to room temperature, i.e., 25° C. Where upon, silicic acid. 249 g with a specific gravity of 1.047, was added over a 40 minute period. Once all of the silicic acid was added to the reaction mixture, agitation continued for an additional hour. The colloidal silica formed contained 8.26% by weight SiO$_2$.

TABLE III

Property Comparisons

| Sample Id. | S. A. (m$^2$/g) | S-Value | DLS Dia. (nm) |
|---|---|---|---|
| 8671 | 700 | 63.5 | 12.6 |
| BMA 0 |  | 65.7 |  |
| BMA 670 | 489 | 32.6 | 15.4 |
| BMA 780 | 435 | 21.6 | 145 |
| Example 13 | 1210 | 24.2 | 56.2 |
| Example 8 | 1052 | 37.1 | 61.1 |
| ACS4[a] | 619 | 98 | 4.5 |
| ACS5[a] | 545 | 47 | 13 |
| ACS6[a] | 500 | 31 | 17 |
| Sample 1[b] |  | 50 | 4.6 |
| Sample 2[b] |  | 37 | 13.3 |
| Sample 3[b] |  | 31 | 16.5 |
| Example 20 |  | 35.6 | 58.5 |

[a]Reference: Nordic Pulp and Paper 11(1), (1996), 15.
[b]Reference: Colloids and Surfaces A, 118, (1996), 89.
Definition:
S. A. = Surface Area as determined via method described below.
DLS = Dynamic Light Scattering is a method used to determine average particle size described below.

EXAMPLE 24

Blend of Colloidal Silica Sol and Borax

A "simple blend" control was prepared by mixing a commercially available colloidal silica and borax. A mixture was prepared at room temperature consisting of 50 g of 0.1M borax solution, 92.3 g of water, and 82 g of Nalco 8671. The pH of the solution was adjusted with concentrated hydrochloric acid to 9.5. The boron to silicon molar ratio was 0.098, while sodium to silicon molar ratio was 0.049.

EXAMPLE 25

Ex. 3 of U.S. Pat. No. 4,954,220

An anionic polysilicate microgel, as described in U.S. Pat. No. 4,954,220 by Rushmere. Example 3 was tested. The purpose of the example within the subject patent was to demonstrate that certain ionic salts induce the formation of polysilicic acid microgel. These salts are chosen so as to adjust the pH of a sodium silicate solution into the unstable, pH range. A 5% by weight borax solution was prepared from 5 g of sodium orthoborate.decahydrate and 95 g of water. A 3.75% sodium silicate solution was prepared from 12.5 g of a commercially available sodium silicate, containing 29.3% as silicon dioxide and 9.0% as sodium oxide, and 87.5 g of water. Following the instructions of the subject patent, 60 g of the 5% borax solution was mixed with 40 g of the dilute sodium silicate solution. The mixture was allowed to stand for 8 minutes after which time it was further diluted to 0.125 weight % as silicon dioxide. It was confirmed repeatedly in our laboratory, that the 1.5% silicon dioxide solution of polysilicic acid microgel gelled upon standing at 23 minutes. The boron to silicon molar ratio was 1.24. Similarly, the sodium to silicon molar ratio was 1.2. The final product solids were 0.125% by weight actives.

EXAMPLE 26

Borax Solution

A blank devoid of silica was prepared for study using 100 mL of 0.1M Borax solution, 48.6 mL of 1M NaOH solution and 300 mL of water. The solution pH was 13.

The following test protocols were used in conducting the experiments presented below.
Preparation of Synthetic Standard Furnishes
  Alkaline Furnish—The alkaline furnish has a pH of 8.1 and is composed of 70 weight percent cellulosic fiber and 30% weight percent filler diluted to an overall consistency of 0.5% by weight using synthetic formulation water. The cellulosic fiber consists of 60% by weight bleached hardwood kraft and 40% by weight bleached softwood kraft. These are prepared from dry lap beaten separately to a Canadian Standard Freeness (CSF) value ranging from 340 to 380 CSF. The filler was a commercial ground calcium carbonate provided in dry form. The formulation water contained 200 ppm calcium hardness (added as $CaCl_2$), 152 ppm magnesium hardness (added as $MgSO_4$), and 110 ppm bicarbonate alkalinity (added as $NaHCO_3$).

Acid Furnish—The acid furnish consisted of the same bleached kraft hardwood/softwood weight ratio, i.e., 60/40. The total solids of the furnish comprised 92.5% by weight cellulosic fiber and 7.5% by weight filler. The filler was a combination of 2.5% by weight titanium dioxide and 5.0 percent by weight kaolin clay. Other additives included alum dosed at 20 lbs active per ton dry solids. The pH of the furnish was adjusted with 50% sulfuric acid such that the furnish pH was 4.8 after alum addition.

Britt Jar Test

The Britt Jar Test used a Britt CF Dynamic Drainage Jar developed by K. W. Britt of New York University, which generally consists of an upper chamber of about 1 liter capacity and a bottom drainage chamber, the chambers being separated by a support screen and a drainage screen. Below the drainage chamber is a flexible tube extending downward equipped with a clamp for closure. The upper chamber is provided with a 2-inch, 3-blade propeller to create controlled shear conditions in the upper chamber. The test was done following the sequence below:

TABLE IV

Alkaline Furnish Test Protocol

| Time (seconds) | Agitator Speed (rpm) | Action |
| --- | --- | --- |
| 0 | 750 | Commence shear via mixing-Add cationic starch. |
| 10 | 1500 | Add Flocculant. |
| 40 | 750 | Reduce the shear via mixing speed. |
| 50 | 750 | Add the microparticle. |
| 60 | 750 | Open the tube clamp to commence drainage. |
| 90 | 750 | Stop draining. |

TABLE V

Acid Furnish Test Protocol

| Time (seconds) | Agitator Speed (rpm) | Action |
| --- | --- | --- |
| 0 | 750 | Commence shear via mixing. Add cationic starch and alum. |
| 10 | 1500 | Add Flocculant. |
| 40 | 750 | Reduce the shear via mixing speed. |
| 50 | 750 | Add the microparticle. |
| 60 | 750 | Open the tube clamp to commence drainage. |
| 90 | 750 | Stop draining. |

In all cases above, the starch used was Solvitose N, a cationic potato starch, commercially available from Nalco. In the case of the alkaline furnish, the cationic starch was introduced at 10 lbs/ton dry weight of furnish solids or 0.50 parts by weight per hundred parts of dry stock solids, while the flocculant was added at 6 lbs/ton dry weight of furnish solids or 0.30 parts by weight per hundred parts of dry stock solids. In the case of the acid furnish, the additive dosages were: 20 lbs/ton dry weight of furnish solids of active alum (i.e., 1.00 parts by weight per hundred parts of dry stock solids). 10 lbs/ton dry weight of furnish solids or 0.50 parts by weight per hundred parts of dry stock solids of cationic starch, and the flocculant was added at 6 lbs/ton dry weight of furnish solids or 0.30 parts by weight per hundred parts of dry stock solids.

The material so drained from the Britt Jar (the "filtrate") is collected and diluted with water to provide a turbidity which can be measured conveniently. The turbidity of such diluted filtrate, measured in Nephelometric Turbidity Units or NTUs, is then determined. The turbidity of such a filtrate is inversely proportional to the papermaking retention performance; the lower the turbidity value, the higher is the retention of filler and/or fines. The turbidity values were determined using a Hach Turbidimeter. In some cases, instead of measuring turbidity, the % Transmittance (%T) of the sample was determined using a DigiDisc Photometer. The transmittance is directly proportional to papermaking retention performance; the higher the transmittance value, the higher is the retention value.

SLM (Scanning Laser Microscopy)

The Scanning Laser Microscopy employed in the following examples is outlined in U.S. Pat. No. 4,871,251, issued to Preikschat, F. K. and E. (1989) and generally consists of a laser source, optics to deliver the incident light to and retrieve the scattered light from the furnish, a photodiode, and signal analysis hardware. Commercial instruments are available from Lasentec™, Redmond, Wash.

The experiment consists of taking 300 mL of cellulose fiber containing slurry and placing this in the appropriate mixing beaker. Shear is provided to the furnish via a variable speed motor and propeller. The propeller is set at a fixed distance from the probe window to ensure slurry movement across the window. A typical dosing sequence is shown below.

TABLE VI

Scanning Laser Microscopy Test Protocol

| Time (minutes) | Action |
| --- | --- |
| 0 | Commence mixing. Record baseline floc size. |
| 1 | Add cationic starch. Record floc size change. |
| 2 | Add flocculant. Record floc size change. |
| 4 | Add the microparticle. Record floc size change. |
| 7 | Terminate experiment. |

The change in mean chord length of the flocs present in the furnish relates to papermaking retention performance; the greater the change induced by the treatment, the higher the retention value.

Surface Area Measurement

Surface area reported herein is obtained by measuring the adsorption of base on the surface of sol particles. The method is described by Sears in *Analytical Chemistry*, 28(12), 1981–1983(1956). As indicated by Iler ("The Chemistry of Silica", John Wiley & Sons, 1979, 353), it is the "value for comparing relative surface areas of particle sizes in a given system which can be standardized." Simply put, the method involves the titration of surface silanol groups with a standard solution of sodium hydroxide, of a know amount of silica (i.e., grams), in a saturated sodium chloride solution. The resulting volume of titrant is converted to surface area.

S-value Determination

Another characteristic of colloids in general, is the amount of space occupied by the dispersed phase. One method for determining this was first developed by R. Iler and R. Dalton and reported in *J. Phys. Chem.*, 60(1956), 955–957. In *colloidal silica systems*, they showed that the S-value relates to the degree of aggregation formed within the product. A lower S-value indicates a greater volume is occupied by the same weight of colloidal silica.

DLS Particle Size Measurement

Dynamic Light Scattering (DLS) or Photon Correlation Spectroscopy (PCS) has been used to measure particle size in the submicron range since as early as 1984. An early treatment of the subject is found in "Modern Methods of Particle Size Analysis", H. Barth, editor, Wiley, New York, 1984. The method consists of filtering a small volume of the sample through a 0.45 micron membrane filter to remove stray contamination such as dust or dirt. The sample is then placed in a cuvette which in turn is placed in the path of a focused laser beam. The scattered light is collected at 90° to the incident beam and analyzed to yield the average particle size. The present work used a Coulter® N4 unit, commercially available from Coulter Corporation, Scientific Instruments.

The following examples show the results of a comparison between the colloidal borosilicate compositions of the invention and the prior art in several papermaking furnishes.

Britt Jar Results
Alkaline Furnish
10 lbs/t Solvitose N followed by 6 lbs/t Polymer "A"

| | | Turbidity/3 (NTU) | | | | Turbidity Improvement (%) | | | |
|---|---|---|---|---|---|---|---|---|---|
| Compound | 0.0 lb/t | 0.5 lb/t | 1.0 lb/t | 1.5 lb/t | 2.0 lb/t | 0.5 lb/t | 1.0 lb/t | 1.5 lb/t | 2.0 lb/t |
| Blank | 380 | | | | | | | | |
| 8671 | | 355 | 310 | 210 | 205 | 6.6 | 18.4 | 44.7 | 46.1 |
| Example 3 | | 225 | 137 | 160 | 110 | 40.8 | 63.9 | 57.9 | 71.1 |
| Example 6 | | 180 | 150 | 125 | 170 | 52.6 | 60.5 | 67.1 | 55.3 |
| Example 7 | | 170 | 145 | 180 | 180 | 55.3 | 61.5 | 52.6 | 52.6 |
| Blank | 350 | | | | | | | | |
| 8671 | | 316 | 340 | 210 | 180 | 9.7 | 2.9 | 40.0 | 48.6 |
| Example 8 | | 205 | 170 | 140 | 130 | 41.4 | 51.4 | 60.0 | 62.9 |

Britt Jar Results
Acid Furnish
20 lbs/t Alum, 10 lbs/t Solvitose N followed by 6 lbs/t Polymer "A"

| | | Turbidity/3 (NTU) | | | | | | Turbidity Improvement (%) | | | |
|---|---|---|---|---|---|---|---|---|---|---|---|
| Compound | 0.0 lb/t | 0.5 lb/t | 1.0 lb/t | 2.0 lb/t | 3.0 lb/t | 4.0 lb/t | 0.5 lb/t | 1.0 lb/t | 2.0 lb/t | 3.0 lb/t | 4.0 lb/t |
| Blank | 390 | | | | | | | | | | |
| 8671 | | 330 | 355 | 290 | 270 | 230 | 15.4 | 9.0 | 25.6 | 30.8 | 41.0 |
| Example 6 | | | 260 | 180 | 155 | 130 | | 33.3 | 53.8 | 60.3 | 66.7 |

| | | Turbidity/3 (NTU) | | | | Turbidity Improvement (%) | | | |
|---|---|---|---|---|---|---|---|---|---|
| Compound | 0.0 lb/t | 0.5 lb/t | 1.0 lb/t | 1.5 lb/t | 2.0 lb/t | 0.5 lb/t | 1.0 lb/t | 1.5 lb/t | 2.0 lb/t |
| Blank | 318 | | | | | | | | |
| 8671 | | 270 | 288 | 255 | 250 | 15.1 | 9.4 | 19.8 | 21.4 |
| Example 25 - Ex. 3 of U.S. Pat. No. 4,954,220 | | 298 | 255 | 235 | 220 | 6.3 | 19.8 | 26.1 | 30.8 |
| Example 13 | | 250 | 225 | 180 | 160 | 21.4 | 29.2 | 43.4 | 49.7 |

| | | Turbidity/3 (NTU) | | | | Turbidity Improvement (%) | | | |
|---|---|---|---|---|---|---|---|---|---|
| Compound | 0.0 lb/t | 0.5 lb/t | 1.0 lb/t | 1.5 lb/t | 2.0 lb/t | 0.5 lb/t | 1.0 lb/t | 1.5 lb/t | 2.0 lb/t |
| Blank | 360 | | | | | | | | |
| 8671 | | 300 | 313 | 275 | 295 | 16.7 | 13.1 | 23.6 | 18.1 |
| Example 6 | | 270 | 225 | 180 | 150 | 25.0 | 37.5 | 50.0 | 58.3 |
| Example 7 | | 260 | 210 | 180 | 195 | 27.8 | 41.7 | 50.0 | 45.8 |
| Example 8 | | 310 | 280 | 210 | 155 | 13.9 | 22.2 | 41.7 | 56.9 |

| | | Turbidity/3 (NTU) | | | | Turbidity Improvement (%) | | | |
|---|---|---|---|---|---|---|---|---|---|
| Compound | 0.0 lb/t | 0.5 lb/t | 1.0 lb/t | 1.5 lb/t | 2.0 lb/t | 0.5 lb/t | 1.0 lb/t | 1.5 lb/t | 2.0 lb/t |
| Blank | 345 | | | | | | | | |
| 8671 | | 245 | 235 | 220 | 230 | 29.0 | 31.9 | 36.2 | 33.3 |
| Example 13 | | 220 | 213 | 195 | 155 | 36.2 | 38.3 | 43.5 | 55.1 |
| Example 6 | | 250 | 200 | 195 | 130 | 27.5 | 42.0 | 43.5 | 62.3 |
| Example 14 | | 250 | 228 | 205 | 170 | 27.5 | 33.9 | 40.6 | 50.7 |

-continued

Britt Jar Results
Acid Furnish
20 lbs/t Alum, 10 lbs/t Solvitose N followed by 6 lbs/t Polymer "A"

| | | | | | | | | |
|---|---|---|---|---|---|---|---|---|
| Example 8 | 270 | 250 | 210 | 200 | 21.7 | 27.5 | 39.1 | 42.0 |
| Bentonite | 290 | 250 | 210 | 205 | 15.9 | 27.5 | 39.1 | 40.6 |

| | Turbidity/3 (NTU) | | Turbidity Improvement (%) |
|---|---|---|---|
| Compound | 0.0 lb/t | 2.0 lb/t | 2.0 lb/t |
| Blank | 345 | | |
| Example 26 [Borax (only)] | | 345 | 0.0 |
| Example 26 [Borax @ 180X (only)] | | 280 | 18.8 |
| 8671 | | 275 | 20.3 |
| Example 24 [8671 with Borax] | | 280 | 18.8 |
| Example 6 | | 115 | 66.7 |
| Example 14 | | 170 | 50.7 |
| Example 13 | | 155 | 55.1 |

SLM Data
Acid Furnish
10 lbs/t Alum, 10 lbs/t Solvitose N followed by 4 lbs/t Polymer "A"

| Compound | Description | Delta @ Maximum (microns) @ 2.0 lb/t | Improvement (%) @ 2.0 lb/t |
|---|---|---|---|
| 8671 | colloidal silica | 3.65 | |
| Example 13 | | 35.3 | 867 |
| Example 24 | 8671 + borax (aged 2 hrs) | 2.4 | −34 |

SLM Data
Alkaline Furnish
10 lbs/t Solvitose N followed by 6 lbs/t Polymer "A"

| Compound | Description | Delta @ Maximum (microns) @ 2.0 lb/t | Improvement (%) @ 2.0 lb/t |
|---|---|---|---|
| 8671 | colloidal silica | 23.4 | |
| 8671 | colloidal silica | 18.7 | |
| 8671 | colloidal silica | 19.8 | |
| | mean | 20.6 | |
| | standard deviation | 2.5 | |
| Example 24 | 8671 + borax | 23.1 | 12 |
| Example 13 | | 57.9 | 181 |

Note: Example 24 is statistically equivalent to Nalco 8671.

EXAMPLE 27

The following work was done on a commercial alkaline fine paper composed of 100% bleached hardwood virgin fibers. Ash content was 8% via precipitated calcium carbonate. Consistency was targeted at 1%. The furnish also contained recycled coated broke.

SLM Data
Commercial Alkaline Fine Paper
20 lbs/t Cationic Starch followed by 2 lbs/t Polymer "B"

| Compound | Description | Delta @ Maximum (microns) @ 2.0 lb/t | Improvement (%) @ 2.0 lb/t |
|---|---|---|---|
| 8671 | colloidal silica | 5.17 | |
| Example 6 | | 13.5 | 161 |

SLM Data
Alkaline Furnish
10 lbs/t Solvitose N followed by 6 lbs/t Polymer "A"

| | Delta @ maximum (microns) | | | Improvement (%) | | |
|---|---|---|---|---|---|---|
| Compound | 0.5 lb/t | 1.0 lb/t | 2.0 lb/t | 0.5 lb/t | 1.0 lb/t | 2.0 lb/t |
| 8671 | 9.5 | 18.8 | 27.0 | | | |
| Example 7 | 35.9 | 50.3 | 74.4 | 277.9 | 167.6 | 175.6 |
| Example 6 | 28.4 | 57.7 | 74.1 | 198.9 | 206.9 | 174.4 |

-continued

SLM Data
Alkaline Furnish
10 lbs/t Solvitose N followed by 6 lbs/t Polymer "A"

| | Delta @ maximum (microns) | | | | Improvement (%) | | | |
|---|---|---|---|---|---|---|---|---|
| Compound | 0.5 lb/t | 1.0 lb/t | 1.5 lb/t | 2.0 lb/t | 0.5 lb/t | 1.0 lb/t | 1.5 lb/t | 2.0 lb/t |
| 8671 | 7.0 | 13.1 | | 24.6 | | | | |
| Example 3 | 29.2 | 42.6 | | 66.9 | 317.1 | 225.2 | | 172.0 |

EXAMPLE 28

The following data were collected using an alkaline furnish prepared using European hardwood and softwood drylap. The preparation follows that outlined above for "standard" alkaline furnish. The alkaline furnish has a pH of 8.1 and is composed of 70 weight percent cellulosic fiber and 30% weight percent filler diluted to an overall consistency of 0.5% by weight using synthetic formulation water. The cellulosic fiber consists of 60% by weight European bleached hardwood kraft and 40% by weight European bleached softwood kraft. These are prepared from dry lap beaten separately to a Canadian Standard Freeness value ranging from 340 to 380 CSF. The filler was a commercial ground calcium carbonate provided in dry form. The formulation water contained 200 ppm calcium hardness (added as $CaCl_2$), 152 ppm magnesium hardness (added as $MgSO_4$), and 110 ppm bicarbonate alkalinity (added as $NaHCO_3$).

Britt Jar Results
European Alkaline Furnish
10 lbs/t Solvitose N followed by 6 lbs/t Polymer "A"

| | Turbidity/3 (NTU) | | | | Improvement (%) | | |
|---|---|---|---|---|---|---|---|
| Compound | 0.0 lb/t | 0.5 lb/t | 1.0 lb/t | 2.0 lb/t | 0.5 lb/t | 1.0 lb/t | 2.0 lb/t |
| Blank | 465 | | | | | | |
| 8671 | | 404 | 255 | 104 | 13.1 | 45.2 | 77.6 |
| N-74907 | | 434 | 360 | 263 | 6.7 | 22.6 | 43.4 |
| Example 13 | | 236 | 80 | 60 | 49.2 | 82.8 | 87.1 |

Britt Jar Results
European Alkaline Furnish
10 lbs/t Solvitose N followed by 6 lbs/t Polymer "A"

| | Turbidity/3 (NTU) | | Turbidity Improvement (%) |
|---|---|---|---|
| Compound | 0.01 lb/t | 1.0 lb/t | 1.0 lb/t |
| Blank | 465 | | |
| 8671 | | 255 | 45.2 |
| N-74907 | | 360 | 22.6 |
| Example 13 | | 84.0 | 81.9 |
| Example 15 | | 33.0 | 92.9 |

SLM Data
European Alkaline Furnish
10 lbs/t Solvitose N followed by 6 lbs/t Polymer "A"

| Compound | Description | Delta @ Maximum @ 2.0 lb/t | Improvement (%) @ 2.0 lb/t |
|---|---|---|---|
| 8671 | coiloidal silica | 16.6 | |
| N-74907 | colloidal silica | 5.3 | −68 |
| Bentonite | Natural Mineral | 54.4 | 228 |
| Example 13 | Subject of patent | 45.5 | 174 |

EXAMPLE 29

The next furnish, a commercial European furnish, is used to prepare coated alkaline fine paper. The furnish consists of 50% cellulosic fiber, i.e. 100% bleached kraft fiber, and 50% filler. The filler is ground calcium carbonate. The furnish has a pH of 7.4 and an overall consistency of 1.5%. The Britt Jar and SLM testing protocol consisted of the following sequence:

Commercial European Alkaline Furnish Test Protocol

| Time (seconds) | Agitator Speed (rpm) | Action |
|---|---|---|
| 0 | 800 | Commence shear via mixing. |
| 5 | 800 | Add Coagulant (Polymer "C" @ 0.5 kg/t). |
| 15 | 800 | Add Alkyl Ketene Dimer Size @ 3 kg/t. |
| 20 | 800 | Add Flocculant A (Polymer "G" @ 0.35 kg/t). |
| 30 | 800 | Add Flocculant B (Polymer "D" @ 0.35 kg/t). |
| 35 | 800 | Add Microparticle @ 0.5 kg/t. |
| 40 | 800 | Open the tube clamp to commence drainage. |
| 45 | 800 | Begin collecting sample for Turbidity. |
| 75 | 800 | Stop draining. |

Britt Jar Results
Commercial European Alkaline Furnish
See Sequence Above.

| Compound | Turbidity/3 (NTU) | | Turbidity Improvement (%) |
|---|---|---|---|
| | 0.01 lb/t | 0.5 kg/t | 0.5 kg/t |
| Blank | 753 | | |
| 8671 | | 533 | 29.2 |
| Bentonite | | 363 | 51.8 |
| Example 13 | | 393 | 47.8 |
| Example 15 | | 362 | 51.9 |

SLM Data
Commercial European Alkaline Furnish
See Sequence Above.

| Compound | Description | Delta @ Maximum @ 2.0 kg/t | Improvement (%) @ 2.0 kg/t |
|---|---|---|---|
| 8671 | colloidal silica | 6.6 | |
| N-74907 | colloidal silica | 4.4 | −33 |
| Bentonite | Natural Mineral | 26.0 | 294 |
| Example 13 | Subject of patent | 25.1 | 280 |
| Example 15 | Subject of patent | 29.8 | 352 |

EXAMPLE 30

The next furnish, a commercial European furnish, is an acid furnish composed of 40% TMP fiber consisting of sulfite bleached and unbleached, 40% is kraft fiber and the remaining is coated broke. The filler is kaolin clay. The final product is a LWC (i.e., Light Weight Coated) grade. In particular, the furnish pH was 4.8, with a consistency of 0.71%. The Britt Jar and SLM testing protocol consisted of the following sequence:

Commercial European Acid TMP Furnish Test Protocol

| Time (seconds) | Agitator Speed (rpm) | Action |
|---|---|---|
| 0 | 800 | Commence shear via mixing. |
| 10 | 800 | Add 8 kg/t of alum and 5 kg/Cationic Starch. |
| 15 | 800 | Add Coagulant Polymer "C" @ 5 kg/t). |
| 30 | 800 | Add Flocculant (Polymer "E" @ 0.66 kg/t). |
| 35 | 800 | Add Microparticle @ 2.0 kg/t. |
| 40 | 800 | Open the tube clarnp to commence drainage |
| 45 | 800 | Begin collecting sarnple for Turbidity. |
| 75 | 800 | Stop draining. |

Britt Jar Results
Commercial European Acid TMP Furnish
See Sequence Above.

| Compound | Turbidity/3 (NTU) | | Turbidity Improvement (%) |
|---|---|---|---|
| | 0.01 lb/t | 2.0 kg/t | 2.0 kg/t |
| Blank | 348 | | |
| 8671 | | 335 | 3.7 |
| N-74907 | | 360 | −3.4 |
| Bentonite | | 227 | 34.8 |
| Example 13 | | 233 | 33.0 |
| Example 15 | | 247 | 29.0 |

SLM Data
Commercial European Acid TMP Furnish
See Sequence Above.

| Compound | Description | Delta @ Maximum @ 2.0 kg/t | Improvement (%) @ 2.0 kg/t |
|---|---|---|---|
| 8671 | colloidal silica | −0.3 | |
| N-74907 | colloidal silica | 3.4 | 1233 |
| Bentonite | Natural Mineral | 21.1 | 7133 |
| Example 13 | Subject of patent | 10.7 | 3667 |
| Example 15 | Subject of patent | 10.0 | 3433 |

Sequence the same, however the dosages of polymers changed. Alum was added at 6.7 kg/t, cationic starch added at 5.0 kg/t, the coagulant was added at 5.0 kg/t, the flocculant was added at 0.66 kg/t just prior to the microparticle being added at 2.0 kg/t.

EXAMPLE 31

The next furnish, a commercial European furnish, is an alkaline furnish. The alkaline furnish consists of 32% Kraft fiber, 48% broke, and 20% ash. The Kraft fiber consists of 63% hardwood and 37% softwood kraft pulp. The 20% ash is composed of equal components of precipitated and ground calcium carbonate. The furnish pH was 8.25, with a consistency of 1.2%. The SLM testing protocol consisted of the following sequence: at 30 seconds the coagulant, Polymer "C", was added at 1.0 kg/t; this was followed 30 seconds later with the flocculant, Polymer "F" at 0.5 kg/t; and the last additive was the microparticle at 90 seconds and at 1.0 kg/t.

| SLM Data Commercial European Alkaline Furnish See Sequence Above. | | | |
|---|---|---|---|
| Compound | Description | @ 1.0 kg/t | @ 1.0 kg/t |
| 8671 | colloidal silica | 19.8 | |
| N-74907 | colloidal silica | 31.3 | 58 |
| Bentonite | Natural Mineral | 26.0 | 31 |
| Example 13 | Subject of patent | 36.1 | 82 |
| Example 15 | Subject of patent | 42.1 | 113 |

EXAMPLE 32

The next furnish, a commercial European furnish, is used to make a neutral coated wood-containing sheet. The furnish consisted of CTMP, coated broke and some Kraft pulp. The furnish pH was 7.5, with a consistency of 0.7%. Of this some 20% was ash. The SLM testing protocol consisted of the following sequence: beginning with cationic starch at 8 kg/t; at 60 seconds the coagulant, Polymer "C", was added at 4.8 kg/t; this was followed 30 seconds later with the flocculant, Polymer "E" at 0.9 kg/t; and the last additive was the microparticle at 120 seconds and at 2.0 kg/t.

| SLM Data Commercial European CTMP Furnish See Sequence Above. | | | |
|---|---|---|---|
| Compound | Description | Delta @ Maximum @ 1.0 kg/t | Improvement (%) @ 1.0 kg/t |
| 8671 | colloidal silica | 8.98 | |
| N-74907 | colloidal silica | 3.37 | −62 |
| Example 13 | Subject of patent | 18.9 | 110 |
| Example 15 | Subject of patent | 27.3 | 204 |

Changes can be made in the composition, operation and arrangement of the method of the present invention described herein without departing from the concept and scope of the invention as defined in the following claims:

What is claimed is:

1. A Method for increasing retention of fines and fillers on a cellulosic sheet formed from a papermaking furnish subjected to papermaking conditions comprising the steps of:

adding to the papermaking furnish from about 0.00005 to about 1.25% by weight, based on the dry weight of fiber in the furnish, of a borosilicate having a mole ratio of boron to silicon of from about 1:1000 to about 100:1, a mole ratio of alkali metal to silicon of from about 6:1000 to about 1.04:1, a particle size of from about 1 to 2000 nm; and a surface area of from about 15 to 3000 $m^2/g$; and from about 0.001 to about 0.5% by weight, based on the dry weight of fiber in the furnish of a substantially water soluble polymeric flocculant having a molecular weight greater than 500,000 Daltons; and then subjecting the furnish to papermaking conditions; and recovering a cellulosic sheet, whereby the retention of fines and fillers on said sheet and the rate of drainage of liquid from said sheet is increased.

2. The method according to claim 1, wherein the papermaking furnish is selected from the group consisting of fine paper, board, and newsprint paper making furnishes.

3. The method according to claim 1, wherein the colloidal borosilicate is added after the flocculent.

4. The method of claim 3 wherein the furnish is subjected to a shear stage after the addition of flocculant but prior to the addition of borosilicate.

5. The method according to claim 1, further comprising the addition of a composition selected from a group consisting of: bentonite, talc, hectorite, kaolin and mixtures thereof.

6. The method according to claim 1, wherein the colloidal borosilicate is added in an amount of from about 0.005 to about 0.25% by weight based on the dry weight of fiber in the furnish.

7. The method according to claim 1, wherein the colloidal borosilicate is added in an amount of from about 0.005 to about 0.15% by weight based on dry weight of fiber in the furnish.

8. The method according to claim 1, wherein the flocculant is added in an amount of from about 0.005 to about 0.2% by weight based on dry weight of fiber in the furnish.

* * * * *